US006769486B2

(12) United States Patent
Lim et al.

(10) Patent No.: US 6,769,486 B2
(45) Date of Patent: Aug. 3, 2004

(54) CYCLIC SOLVENT PROCESS FOR IN-SITU BITUMEN AND HEAVY OIL PRODUCTION

(75) Inventors: Git B. Lim, Calgary (CA); P. Richard Kry, Calgary (CA); J. Pierre Lebel, Calgary (CA); Mori Y. Kwan, Calgary (CA)

(73) Assignee: ExxonMobil Upstream Research Company, Houston, TX (US)

( * ) Notice: Subject to any disclaimer, the term of this patent is extended or adjusted under 35 U.S.C. 154(b) by 38 days.

(21) Appl. No.: 10/158,611

(22) Filed: May 30, 2002

(65) Prior Publication Data

US 2003/0015321 A1 Jan. 23, 2003

(51) Int. Cl.[7] .............................................. E21B 43/16
(52) U.S. Cl. ..................... 166/263; 166/370; 166/305.1
(58) Field of Search ................................ 166/271, 267, 166/310, 371, 50, 372, 306, 305.1, 369, 370, 263

(56) References Cited

U.S. PATENT DOCUMENTS

| | | | |
|---|---|---|---|
| 2,365,591 A | 12/1944 | Ranney | 262/1 |
| 3,608,638 A | 9/1971 | Terwilliger | 166/272 |
| 3,908,762 A | 9/1975 | Redford | 166/263 |
| 3,954,141 A * | 5/1976 | Allen et al. | 166/403 |
| 3,960,214 A | 6/1976 | Striegler et al. | 166/272 |
| 3,986,557 A | 10/1976 | Striegler et al. | 166/272 |
| 4,004,636 A | 1/1977 | Brown et al. | 166/272 |
| 4,007,785 A | 2/1977 | Allen et al. | 166/263 |
| 4,020,901 A | 5/1977 | Pisio et al. | 166/50 |
| 4,026,358 A | 5/1977 | Allen | 166/261 |
| 4,034,812 A | 7/1977 | Widmyer | 166/303 |
| 4,037,658 A | 7/1977 | Anderson | 166/272 |
| 4,067,391 A | 1/1978 | Dewell | 166/303 |
| 4,085,803 A | 4/1978 | Butler | 166/303 |
| 4,099,568 A | 7/1978 | Allen | 166/269 |

(List continued on next page.)

FOREIGN PATENT DOCUMENTS

| | | | |
|---|---|---|---|
| CA | 1015656 | 8/1977 | ......... 166/31 |
| CA | 1059432 | 7/1979 | ......... E21B/43/00 |
| CA | 1122115 | 4/1989 | ......... E21B/43/28 |
| CA | 2108349 | 8/1996 | |
| CA | 2147079 | 10/1996 | ......... E21B/43/16 |
| CA | 2304938 | 2/2001 | ......... E21B/43/24 |
| CA | 2243105 | 11/2001 | ......... E21B/43/22 |

OTHER PUBLICATIONS

Gupta, S., Gittins, S., Picherack, P., "Insights into Some Key Issues with Solvent Aided Process", Petroleum Society—Canadian Institute of Mining, Metallurgy & Petroleum, Paper No. 2001–126, pp 1–23, Jun. 12–14, 2001.

Vogel, J.V., "How Solvent Vapors Can Improve Steam Floods", World Oil, Nov. 1996.

Nasr, T.N., Kimber, K.D., Jha, K.N., "A Novel Scaled Physical Simulator for Horizontal Well Enhanced Oil Recovery", Petroleum Society of CIM and CANMET, Paper No. 5, pp 5–1 to 5–19, Oct. 7–9, 1991.

(List continued on next page.)

*Primary Examiner*—David Bagnell
(74) *Attorney, Agent, or Firm*—Gary P. Katz

(57) ABSTRACT

A process for recovery of hydrocarbons in a production fluid from an underground reservoir of said hydrocarbons, the process comprising of: (a) injecting a viscosity reducing solvent of a fraction of said hydrocarbons into said reservoir at a pressure in the reservoir of above a liquid/vapor phase change pressure of a fraction of said solvent; said pressure in said reservoir also being sufficient to cause geomechanical formation dilation or pore fluid compression, and then, (b) allowing said solvent to mix with said hydrocarbons under pore dilation conditions, and then, (c) reducing the pressure in said reservoir to below said liquid/vapor phase change pressure of at least said fraction of said solvent thereby evincing solvent gas drive of said fraction of said hydrocarbons from said reservoir; and then, (d) repeating steps (a) to (c) as required.

19 Claims, 7 Drawing Sheets

U.S. PATENT DOCUMENTS

| | | | |
|---|---|---|---|
| 4,109,720 A | 8/1978 | Allen et al. | 166/269 |
| 4,116,275 A | 9/1978 | Butler et al. | 166/303 |
| 4,127,170 A | 11/1978 | Redford | 166/252 |
| 4,160,481 A | 7/1979 | Turk et al. | 166/272 |
| 4,166,503 A | 9/1979 | Hall et al. | 166/263 |
| 4,257,650 A | 3/1981 | Allen | 299/2 |
| 4,262,745 A | 4/1981 | Stewart | 166/263 |
| 4,280,559 A | 7/1981 | Best | 166/303 |
| 4,293,035 A | 10/1981 | Fitch | 166/273 |
| 4,296,969 A | 10/1981 | Willman | 299/2 |
| 4,324,291 A | 4/1982 | Wong et al. | 166/252 |
| 4,344,485 A | 8/1982 | Butler | 166/271 |
| 4,372,383 A | 2/1983 | Ames | 166/266 |
| 4,373,585 A | 2/1983 | Fitch et al. | 166/263 |
| 4,379,592 A | 4/1983 | Vakhnin et al. | 299/2 |
| 4,385,662 A | 5/1983 | Mullins et al. | 166/263 |
| 4,390,067 A | 6/1983 | Willman | 166/245 |
| 4,434,849 A | 3/1984 | Allen | 166/252 |
| 4,450,913 A | 5/1984 | Allen et al. | 166/303 |
| 4,460,044 A | 7/1984 | Porter | 166/252 |
| 4,463,988 A | 8/1984 | Bouck et al. | 299/2 |
| 4,466,485 A | 8/1984 | Shu | 166/272 |
| 4,498,537 A | 2/1985 | Cook | 166/257 |
| 4,501,326 A | 2/1985 | Edmunds | 166/272 |
| 4,510,997 A | 4/1985 | Fitch et al. | 166/263 |
| 4,511,000 A | 4/1985 | Mims | 166/303 |
| 4,513,819 A | 4/1985 | Islip et al. | 166/263 |
| 4,519,454 A | 5/1985 | McMillen | 166/303 |
| 4,535,845 A | 8/1985 | Brown et al. | 166/272 |
| 4,565,245 A | 1/1986 | Mims et al. | 166/50 |
| 4,577,691 A | 3/1986 | Huang et al. | 166/263 |
| 4,589,486 A | 5/1986 | Brown et al. | 166/252 |
| 4,598,770 A | 7/1986 | Shu et al. | 166/245 |
| 4,640,359 A | 2/1987 | Livesey et al. | 166/276 |
| 4,682,652 A | 7/1987 | Huang et al. | 166/263 |
| 4,697,642 A | 10/1987 | Vogel | 166/263 |
| 4,700,779 A | 10/1987 | Huang et al. | 166/263 |
| 4,706,751 A | 11/1987 | Gondouin | 166/272 |
| 4,753,293 A | 6/1988 | Bohn | 166/267 |
| 4,794,987 A | 1/1989 | Kokolis et al. | 166/274 |
| 4,818,370 A | 4/1989 | Gregoli et al. | 208/106 |
| 4,834,179 A | 5/1989 | Kokolis et al. | 166/268 |
| 4,844,158 A | 7/1989 | Jennings, Jr. | 166/267 |
| 4,846,275 A * | 7/1989 | McKay | 166/402 |
| 4,850,429 A | 7/1989 | Mims et al. | 166/245 |
| 5,060,726 A | 10/1991 | Glandt et al. | 166/248 |
| 5,148,869 A | 9/1992 | Sanchez | 166/303 |
| 5,167,280 A | 12/1992 | Sanchez et al. | 166/267 |
| 5,215,146 A | 6/1993 | Sanchez | 166/263 |
| 5,215,149 A | 6/1993 | Lu | 166/263 |
| 5,244,041 A | 9/1993 | Renard et al. | 166/268 |
| 5,273,111 A | 12/1993 | Brannan et al. | 166/245 |
| 5,339,897 A | 8/1994 | Leaute | 166/245 |
| 5,348,094 A * | 9/1994 | Cholet et al. | 166/371 |
| 5,407,009 A | 4/1995 | Butler et al. | 166/266 |
| 5,411,094 A | 5/1995 | Northrop | 166/303 |
| 5,413,175 A | 5/1995 | Edmunds | 166/252 |
| 5,417,283 A | 5/1995 | Ejiogu et al. | 166/272 |
| 5,456,315 A | 10/1995 | Kisman et al. | 166/245 |
| 5,503,226 A | 4/1996 | Wadleigh | 166/252.1 |
| 5,607,016 A | 3/1997 | Butler | 166/263 |
| 5,626,193 A | 5/1997 | Nzekwu et al. | 166/303 |
| 5,685,371 A | 11/1997 | Richardson et al. | 166/272 |
| 5,771,973 A | 6/1998 | Jensen et al. | 166/303 |
| 5,803,171 A | 9/1998 | McCaffery et al. | 166/245 |
| 5,826,655 A | 10/1998 | Snow et al. | 166/272.3 |
| 5,860,475 A | 1/1999 | Ejiogu et al. | 166/245 |
| 5,899,274 A | 5/1999 | Frauenfeld et al. | 166/401 |
| 5,931,230 A | 8/1999 | Lesage et al. | 166/303 |
| 6,050,335 A | 4/2000 | Parsons | 166/272.3 |
| 6,119,776 A | 9/2000 | Graham et al. | 166/245 |
| 6,158,510 A | 12/2000 | Bacon et al. | 166/272.7 |
| 6,167,966 B1 | 1/2001 | Ayasse et al. | 166/268 |
| 6,186,232 B1 | 2/2001 | Isaacs et al. | 166/272.3 |
| 6,230,814 B1 | 5/2001 | Nasr et al. | 166/400 |
| 6,257,334 B1 | 7/2001 | Cyr et al. | 166/272.7 |
| 6,263,965 B1 | 7/2001 | Schmidt et al. | 166/272.3 |
| 6,305,472 B2 | 10/2001 | Richardson et al. | 166/305.1 |
| 6,318,464 B1 | 11/2001 | Mokrys | 166/252.01 |
| 6,464,009 B2 * | 10/2002 | Bland et al. | 166/300 |
| 2001/0018975 A1 | 9/2001 | Richardson et al. | 166/305.1 |

OTHER PUBLICATIONS

Cuthiell, D., McCarthy, C., Frauenfeld, T., Cameron, S., Kissel, G., "Investigation of the Vapex Process Using CT Scanning and Numerical Simulation", Petroleum Society—Canadian Institute of Mining, Metallurgy & Petroleum, Paper No. 2001–128, pp 1–17, Jun. 12–14, 2001.

Nghiem, L.X., Kohse, B.F., Sammon, P.H., "Compositional Simulation of the Vapex Process", Petroleum Society—Canadian Institute of Mining, Metallurgy & Petroleum, Paper No. 2000–34, Jun. 4–8, 2000.

Doan, Q., Doan, L., Ali, S. M. Farouq, George, A.E., "Usefulness of Scaled Models in Heavy Oil Recovery Development by Steam and Horizontal Wells", 6th UNITAR International Conference, Houston Texas, pp 689–706, Feb. 12–17, 1995.

Das, S. K., Butler, R. M., "Extraction of Heavy Oil and Bitumen Using Solvents at Reservoir Pressure", Petroleum Society of CIM, Paper No. 95–118, pp 1–15, Oct. 16–18, 1995.

Butler, R.M., Mokrys, I.J., "A New Process (VAPEX) for Recovering Heavy Oils using Hot Water and Hydrocarbon Vapour", Petroleum Society of CIM/Society of Petroleum Engineers, Paper No. CUM/SPE 90–133, pp 133–1–133–15, Jun. 10–13, 1990.

Jha, K.N., Butler, R.M., Lim, G.B., Oballa V., "Vapour Extraction (VAPEX) Process for Recovery of Heavy Oil and Bitumen", 6th UNITAR International Conference, Houston Texas, pp 759–774, Feb. 12–17, 1995.

Fair, A.E., McIntosh J.R., "Can In Situ Recovery Compete with Open Pit Mining in the Oil Sands", AOSTRA/Canadian Heavy Oil Association, pp 121–132, Jun. 10–12, 1992.

Chang, H.L., Ali S.M. Farouq, George, A.E., "Performance of Horizontal–Vertical Well Combinations for Steamflooding Bottom Water Formations", Petroleum Society of CIM/Society of Petroleum Engineers, Paper No. CIM/SPE 90–86, pp 86/1–16, Jun. 10–13, 1990.

Chang, H.L., Ali S.M. Farouq, George, A.E., "Steamflood Applications for Marginal Heavy Oil Reservoirs with Underlying Bottom Water", 5th Unitar International Conference on Heavy Crude and Tar Sands, pp 193–205, 1992.

Butler, R., Yee, C. T., "Progress in the In Situ Recovery of Heavy Oils and Bitumen", Petroleum Society—Canadian Institute of Mining, Metallurgy & Petroleum, Paper No. 2000–50, Jun. 4–8, 2000.

Jiang, Q., Butler, R.M., Yee C.T., "Steam and Gas Push (SAGP)—4; Recent Theoretical Developments and Laboratory Results Using Layered Models", Petroleum Society—Canadian Institute of Mining, Metallurgy & Petroleum, Paper No. 2000–51, Jun. 4–8, 2000.

Butler, R.M., "Application of SAGD, Related Processes Growing in Canada", Oil and Gas Journal, pp 74–78, May 14, 2001.

Minssieux, L., Bardon, C., Rouet, J., Groffe, P., "Effects of Asphaltene Deposition in Production Treatment and Prevention Tests", International Symposium on Colloid Chemistry in Oil Production, Nov. 26–29, 1995.

Butler, R.M., "SAGD Comes of Age", JCPT.

Butler, R.M., Yee, C.T., "An Experimental Study of Steam Condensation in the Presence of Non–condensable Gases in Porous Solids", AOSTRA Journal of Research, vol. 3, No. 1, pp 15–23, 1986.

Butler, R.M., "Steam and Gas Push (SAGP)", The Petroleum Society, Paper No. 97–137, pp 1–15, Jun. 8–11, 1997.

Jiang, Q., Bulter, R.M., Yee, C.T., "The Steam and Gas Push (SAGP)–2: Mechanism Analysis and Physics Model Testing", The Petroleum Society, Paper No. 98–43, Jun. 8–10, 1998.

Jiang, Q., Butler, R.M., Yee, C.T., "Development of the Steam and Gas Push (SAGP) Process", GravDrain, Paper No. 1998.59, pp. 1–18, 1998.

Butler, R.M., Jiang, Q., Yee, C.T., "Steam and Gas Push (SAGP)–3; Recent Theoretical Developments and Laboratory Results", The Petroleum Society, Paper No. 99–23, Jun. 14–18, 1999.

Briggs, P.J., Beck, D.L., Black, C.J.J. Bissell, R., "Heavy Oil from Fractured Carbonate Reservoirs", Society of Petroleum Engineers, Inc., SPE No. 19671, May 1992.

Petit, H.J.–M., Renard, G., Valentin, E., "Technical and Economic Evaluation of Steam Injection with Horizontal Wells for Two Typical Heavy–Oil Reservoirs", Society of Petroleum Engineers, Inc., SPE No. 19828, pp 619–629, Oct. 8–11, 1989.

Mokrys, I.J., Butler, R.M., "In–Situ Upgrading of Heavy Oils and Bitumen by Propane Deasphalting: The Vapex Process", Society of Petroleum Engineers, Inc., SPE No. 25452, pp 409–424, Mar. 21–23, 1993, pp. 409–424.

Richardson, W.C., Chu, C., "Composition of Remaining Oil in a Mature Steamflood", Society of Petroleum Engineers, Inc., SPE No. 27796, pp. 137–151, Apr 17–20, 1994.

Donnelly, J.K., Chmilar M.J., "The Commercial Potential of Steam Assisted Gravity Drainage", Society of Petroleum Engineers, Inc., SPE No. 30278, pp 295–308, Jun. 19–21, 1995.

Bulter, R.M., Mokrys, I.J., Das, S.K., "The Solvent Requirements for Vapex Recovery", Society of Petroleum Engineers, Inc., SPE No. 30293, pp 465–474, Jun. 19–21, 1995.

Palmgren, C., Edmunds, N., "High Temperature Naptha to Replace Steam in the SAGD Process", Society of Petroleum Engineers, Inc., SPE No. 30294, pp 475–478, Jun. 19–21, 1995.

Das, S.K., Butler, R.M., "Countercurrent Extraction of Heavy Oil and Bitumen", Society of Petroleum Engineers, Inc., SPE No. 37094, pp 501–510, Nov. 18–20, 1996.

Singhal, A.K., Das, S.K., Leggitt, S.M., Kasraie, M., Ito, Y., "Screening of Reservoirs for Exploitation by Application of Steam Assisted Gravity Drainage/Vapex Processes", Society of Petroleum Engineers, Inc., SPE No. 37144, pp 867–876, Nov. 18–20, 1996.

Jiang, Q., Butler, R.M., "Selection of Well Configurations in Vapex Process", Society of Petroleum Engineers, Inc., SPE No. 37145, pp 877–885, Nov. 18–20, 1996.

Escobar, M.A., Valera, C.A., Perez, R.E., "A Large Heavy Oil Reservoir in Lake Maracaibo Basin: Cyclic Steam Injection Experiences", Society of Petroleum Engineers, Inc., SPE No. 37551, pp 347–447, Feb. 10–12, 1997.

Davies, D.K., Mondragon, J.J., Hara, P.S., "A Novel, Low Cost Well Completion Technique Using Steam for Formations with Unconsolidated Sands, Wilmington Field, California", Society of Petroleum Engineers, Inc., SPE Paper No. 38793, pp. 433–447, Oct. 5–8, 1997.

Das, S. K., "Vapex: An Efficient Process for the Recovery of Heavy Oil and Bitumen", Society of Petroleum Engineers, Inc., SPE Paper No. 50941, pp 232–237, Feb. 10–12, 1997.

Yuan, J.Y., Tremblay, B., Babchin, A., "A Wormhole Network Model of Cold Production in Heavy Oil", Society of Petroleum Engineers, Inc., SPE Paper No. 54097, pp 1–7, Mar. 17–19, 1999.

Escobar, E., Valco, P., Lee, W.J., Rodriguez, M.G., "Optimization Methodology for Cyclic Steam Injection with Horizontal Wells", Petroleum Society—Canadian Institute of Mining, Metallurgy & Petroleum, Paper No. CIM 65525, pp 1–12, Nov. 6–8, 2000.

Nghiem, L.X., Sammon P.H., Kohse, B.F., "Modeling Asphaltene Precipitation and Dispersive Mixing in the Vapex Process", Society of Petroleum Engineers, Inc., SPE Paper No. 66361, pp 1–11, Feb. 11–14, 2001.

Stone, T.W., Bennett, J., Holmes, J.A., "Thermal Simulation with Multisegment Wells", Society of Petroleum Engineers, Inc., SPE Paper No. 66373, pp 1–13, Feb. 11–14, 2001.

Batycky, J., "An Assessment of In situ Oil Sands Recovery Processes", The Journal of Canadian Petroleum Technology, vol. 36, No. 9, pp. 15–19, Oct. 1997.

Butler, R.M. and Mokrys, I.J., "A New Process (VAPEX) for Recovering Heavy Oils Using Hot Water and Hydrocarbon Vapour", JCPT, vol. 30, No. 1, pp. 97–106, Jan.–Feb. 1991.

Butler, R.M. and Mokrys, I.J., Recovery of Heavy Oils Using Vapourized Hydrocarbon Solvents: Further Developments of the VAPEX Process:, JCPT, vol. 32, No. 6, pp. 56–62, Jun. 1993.

S.K. Das and Butler, R.M., "Effect of Asphaltene Deposition on the VAPEX Process: A Preliminary Investigation Using A Hele–Shaw Cell", JCPT, vol. 33, No. 6, pp. 39–45, Jun. 1994.

Das, S.K., "In Situ Recovery of Heavy Oil and Bitumen Using Vaporized Hydrocarbon Solvents", Dissertation for the Degree of Doctor of Philosophy, The University of Calgary, Mar. 1995.

Palmgren, C. and Edmunds, N.; "High Temperature Naptha to Replace Steam in the SAGD Process", International Heavy Oil Symposium, Calgary, Alberta Canada, Jun. 19–21, 1995, SPE 30294.

Butler, R.M., "Thermal Recovery of Oil and Bitumen", GravDrain Inc., Calgary Alberta, Aug. 1997.

Komery, D.P., Luhning, R.W., Pearce, J.V., Goo, W.K., "Pilot Testing of Post–Steam Birumen Recovery from Mature SAGD Wells in Canada", Seventh UNITAR International Conference, Beijing, China, Oct. 27–31, 1998.

S.K. Das and Butler, R.M., "Mechanism of the Vapor Extraction Process for Heavy Oil and Bitumen", Journal of Petroleum Science and Engineering 21, pp. 43–59, 1998.

Saltuklaroglu, M., Wright, G.N., Conrad, P.R., McIntyre, J.R., Manchester, G.T. "Mobil's SAGD Experience at Celtic Saskatchewan", CSPG and Petroleum Society Joint Convention, Calgary, Alberta Canada, Jun. 14–18, 1999.

Donnelly, J.K., "The Best Process for Cold Lake CSS Verse SAGD", CSPG and Petroleum Society Joint Convention, Calgary, Alberta Canada, Jun. 1999.

Luhning, R.W., Lugning, C.P., "The Vapex Process: Non-Thermal Recovery of Birumen and Heavy Oil for Improved Economics and Climate Change Advantage", CHOA Conference, Calgary, Alberta, Canada, Nov. 24, 1999.

Butler, R.M., Bharatha, S., Yee, C.–T., "Natural and Gas–lift in SAGD Production Wells", Journal of Canadian Petroleum Technology, vol. 39, No 1, pp. 18–29, Jan. 2000.

Butler, R.M., Jiang, W., "Improved Recovery of Heavy Oil by Vapex with Widely Spaced Horizontal Injectors and Producers", JCPT, vol., 39, No. 1, pp. 48–56, Jan. 2000.

Lim, G.B., Kry, R.P., Harker, B.C., Jha, K.N., "Cyclic Stimulation of Cold Lake Oil Sand with Supercritical Ethane", Society of Petroleum Engineers, SPE Paper No. 30298, pp 521–528, Jun. 19–21, 1995.

Lim, G.B., Kry, R.P., Harker, B.C., Jha, K.N., "Three Dimensional Scaled Physical Modeling of Solvent Vapour Extraction of Cold Lake Bitumen", Canadian SPE/CIM/CANMET Paper No. HWC94–46, Mar. 20–23, 1994.

* cited by examiner

CYCLIC SOLVENT PROCESS FOR IN-SITU BITUMEN AND HEAVY OIL PRODUCTION

BACKGROUND TO THE INVENTION

This invention relates to an in-situ solvent-based process to produce bitumen from oil sand and heavy oil reservoirs.

A significant amount of bitumen in Alberta and other parts of the world is located either in thin, bottom water reservoirs or water sensitive sands which are not amenable to exploitation by steam based processes. A potential alternative for extracting these reservoirs is a solvent-based process. The advantages of the solvent-based processes are: little heat loss and limited water handling. The disadvantages are: high solvent cost and inherently low production rate limited by mass transfer of the solvent into the bitumen.

In general, many processes and methods utilizing a variety of solvents under a variety of temperature and pressure conditions have been developed to improve solubilization and production of hydrocarbons from reservoirs.

Lim et al in Canadian SPE/CIM/Canmet International Conference on Recent Advances in Horizontal Well Application, Mar. 20–24, 1994, disclose the use of light hydrocarbon solvents to produce bitumen for Cold Lake oil sand in three dimensional scaled physical modelling experiments. The results showed that the production rate of bitumen was significantly higher than what could be expected from molecular diffusion of the solvent into the bitumen. The author surmised that other mechanisms, probably solvent dispersion or fingering are important in mass transfer of solvent into bitumen.

Lim et al (1995) in Society of Petroleum Engineers paper no. SPE 302981 p. 521–528 discloses cyclic stimulation of Cold Lake oil sand with supercritical ethane through a single horizontal injector/producer well in a model system. Supercritical ethane enhanced the cyclic solvent gas process by improving the early production rate. This article directs the reader towards using supercritical ethane.

A problem that remains outstanding is to maximize extraction bitumen from oil sand and heavy oil reservoirs with maximum economy, minimum loss of solvent and to leave minimal residual bitumen in the oil sand and heavy oil reservoirs. A problem unaddressed to date is that of effective solvent distribution in a bitumen reservoir. If the solvent distributes too quickly throughout the reservoir there is a tendency for the solvent to be distributed along long thin solvent fingers penetrating into the reservoir from the point of injection. This leads to ineffective viscosity reduction and poor and difficult recovery of bitumen. If the solvent is insufficiently distributed in short thick fingers then solvent-bitumen contact is too limited to provide efficient bitumen extraction. We have developed an in-situ cyclic solvent-based process to produce bitumen from oil sand and heavy oil reservoirs which has advantages in maximizing solubilization and production rates.

SUMMARY OF THE INVENTION

We have found that careful choice of a viscosity reducing solvent and cyclic injection of this solvent at a pressure in the reservoir of above the liquid/vapor phase change pressure (saturation pressure) of the solvent, the pressure also being sufficient to cause geomechanical formation dilation or pore fluid compression, followed by mixing of the solvent with reservoir hydrocarbons under pore dilation conditions, followed by pressure reduction to below the liquid/vapor phase change pressure can be used to drive at least a fraction of the reservoir hydrocarbons from the reservoir.

The invention therefore provides a process for recovery of hydrocarbons from an underground reservoir of said hydrocarbons, the process comprising of:

(a) injecting a viscosity reducing solvent of a fraction of said hydrocarbons into said reservoir at a pressure in the reservoir of above a liquid/vapor phase change pressure of at least a fraction of said solvent; said pressure in said reservoir also being sufficient to cause geomechanical formation dilation or pore fluid compression, and then, (b) allowing said solvent to mix with said hydrocarbons under pore dilation conditions, and then, (c) reducing the pressure in said reservoir to below said liquid/vapor phase change pressure of at least said fraction of said solvent thereby demonstrating solvent gas drive of a fraction of said hydrocarbons from said reservoir; and then, (d) repeating steps (a) to (c) as required.

In the context of this invention by solvent we mean a compound that has a liquid/vapor phase change pressure that is below the regularly used injection pressure of the reservoir and so is injected in the liquid phase. Preferably, the liquid/vapor phase change pressure should be close to the initial reserve pressure so that the operating reservoir pressure can easily be raised above the phase change pressure during injection and brought down below the phase change pressure during production. It also should be high enough so that the solvent vaporizes at the reduced pressures used for production so that solvent gas drive can be used to assist production. Suitable solvents include lower hydrocarbons, such as methane, ethane and propane, as well as $CO_2$.

In the context of this invention by diluent we mean a liquid compound that can be used to dilute the solvent and can be used to manipulate the viscosity of any resulting solvent-bitumen mixture. By such manipulation of the viscosity of the solvent-bitumen (and diluent) mixture, the invasion, mobility and distribution of solvent in the reservoir can be controlled so as to increase bitumen production.

The diluent is typically a viscous hydrocarbon liquid, especially a $C_4$ to $C_{20}$ hydrocarbon or mixture thereof, is commonly locally produced and is typically used to thin bitumen to pipeline specifications. Pentane, hexane and heptane are commonly components of such diluents. Bitumen itself can be used to modify the viscosity of the injected fluid, often in conjunction with ethane solvent.

In preferred embodiments, the diluent may have an average initial boiling point close to the boiling point of pentane (36° C.) or hexane (69° C.) through the average boiling point (defined further below) may change with reuse as the mix changes (some of the solvent originating among the recovered viscous oil fractions). Preferably more than 50% by weight of the diluent has an average boiling point lower than the boiling point of decane (174° C.). It is more preferred that more than 75% by weight, especially more than 80% by weight, and particularly more than 90% by weight of the diluent has an average boiling point between the boiling point of pentane and the boiling point of decane. In further preferred embodiments, the diluent has an average boiling point close to the boiling point of hexane (69° C.) or heptane (98° C.), or even water (100° C.).

In additional preferred embodiments, more than 50% by weight of the diluent (particularly more than 75% or 80% by weight and especially more than 90% by weight) has a boiling point between the boiling points of pentane and decane. In other preferred embodiments, more than 50% by weight of the diluent has a boiling point between the boiling points of hexane (69° C.) and nonane (151° C.), particularly preferably between the boiling points of heptane (98° C.) and octane (126° C.).

By average boiling point of the diluent, we mean the boiling point of the diluent remaining after half (by weight) of a starting amount of diluent has been boiled off as defined by ASTM D 2887 (1997) for example. The average boiling point can be determined by gas chromatographic methods or more tediously by distillation. Boiling points are defined as the boiling points at atmospheric pressure.

In the context of the invention geomechanical formation dilation means the tendency of a geomechanical formation to dilate when pore pressure is raised to the formation minimum in-situ stress, typically by injecting a liquid or a gas. The formation in-situ stress is typically determined in a well test in which water is injected to the formation at low rates while bottom-hole pressure response is recorded. Analysis of the pressure response would reveal the conditions at which formation failure occurs. Pore fluid compression means just that, compression of a pore fluid (by pressure). In the field, the user can obtain pore fluid compression by multiplying pressure increase by fluid compressibility, which is a fluid property measurable in laboratory tests. Pore dilation refers to dilation of pores in rock or soil and simply means more loosely packed.

In a preferred embodiment, ethane is mixed with bitumen and the diluent and co-injected into the reservoir.

DETAILED DESCRIPTION OF THE INVENTION

This invention discloses an in-situ cyclic solvent-based process to produce bitumen from oil sand and heavy oil reservoirs.

Figure 1:
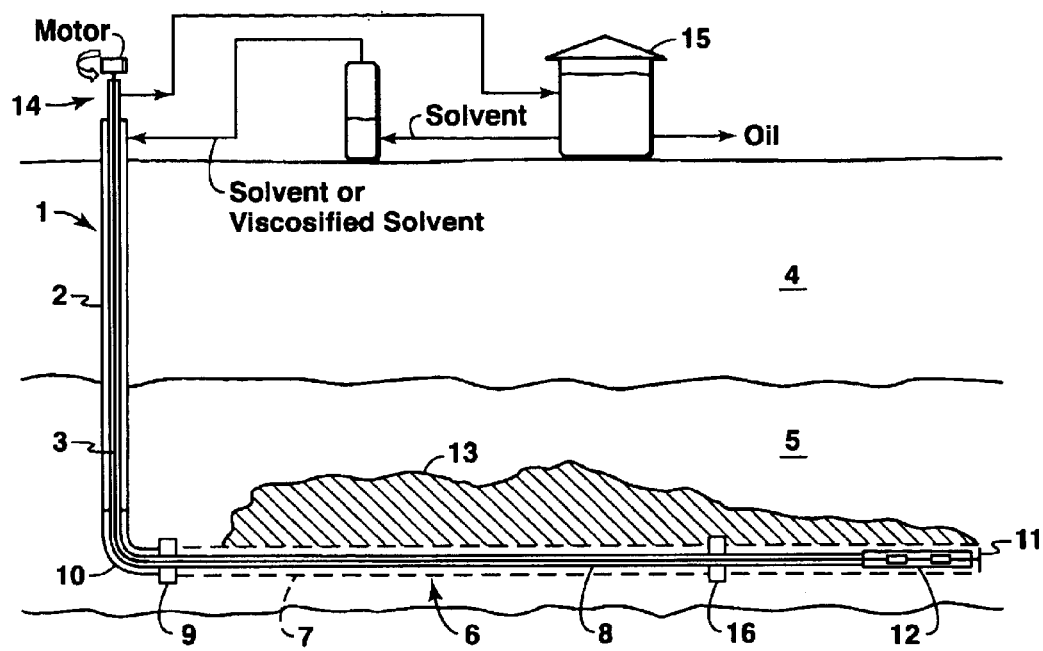
FIG. 1 shows a particular embodiment of the Cyclic Solvent Process (CSP) of the invention.

With reference to FIG. 1, the present invention comprises of a single well method for cyclic solvent stimulation, the single well preferably having a horizontal wellbore portion and a perforated liner section with intake of an artificial lift located at the toe of the liner.

In FIG. 1 a vertical wellbore 1 comprising an outer sleeve 2 and an inner bore 3 driven through overburden 4 into reservoir 5 is connected to a horizontal wellbore portion 6. The horizontal wellbore portion 6 comprises a perforated liner section 7 and an inner bore 8. An isolation packer 9 preferably is located at or near the heel 10 of the horizontal wellbore portion where it joins the vertical wellbore. Another packer 16 located downstream of isolation packer 9 provides a means for diverting diluent to the adjacent reservoir during production. At or near the toe 11 of the horizontal wellbore portion is a down hole pump 12.

In operation solvent or viscosified solvent is driven down outer sleeve 2 to perforated liner section 7 where it percolates into reservoir 5 and penetrates reservoir material to yield a reservoir penetration zone 13. Oil dissolved in the solvent or viscosified solvent flows down and collects at or around the toe 11 and is pumped by down hole pump through inner bores 8 and 3 through a motor at the wellhead 14 to a production tank 15 where oil and solvent are separated and the solvent commonly recycled as shown.

In the practice of this invention, the viscosity reducing solvent is injected at high pressure into the reservoir through the horizontal well. The reservoir accommodates the injected solvent by dilation of its pore space and by compression of pore fluids. The solvent mixes with the reservoir bitumen and the mixture is then produced from the same well. Fluids are driven to the production well by formation re-compaction, fluid expansion and gravity.

The fluid rates decline with time. The injection and production procedures are repeated until the produced solvent to oil ratio (PSOR) is so high that the incremental production becomes uneconomical.

Design of an Injection Procedure

One of the key elements of the invention is in the design of an injection procedure which achieves sufficient solvent mixing with bitumen in the reservoir. A balance in solvent penetration and bitumen contact is essential for the most effective viscosity reduction.

Figure 2A:
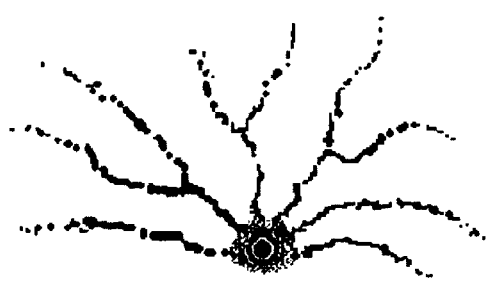
FIG. 2A shows widely spaced thin and long fingers.

If the solvent is distributed too widely during injection, there will be insufficient viscosity reduction to yield economic production rates. An example of this scenario is uncontrolled hydraulic fracturing in which solvent is distributed sparsely over a wide region of the reservoir. Another example would be if solvent were distributed through fingering via relatively few long thin fingers (FIG. 2A). In this case, the solvent finger, being thin, would resaturate rapidly along its length during production, trapping a large fraction of the solvent away from the wellbore and behaving like uncontrolled hydraulic fracturing.

Figure 2B:
FIG. 2B shows solvent penetration limited by thick fingers; and, FIG. 2C shows preferred fine fingers during formation dilation.

If the solvent is not dispersed during injection, most of the solvent remains near the wellbore or in only a few thick solvent fingers. In this case, the contact between solvent and bitumen is too limited to have the desired effect FIG. 2B).

Figure 2C:
FIG. 2 shows scenarios of solvent distribution and mixing with bitumen during injection.
Figure 3:
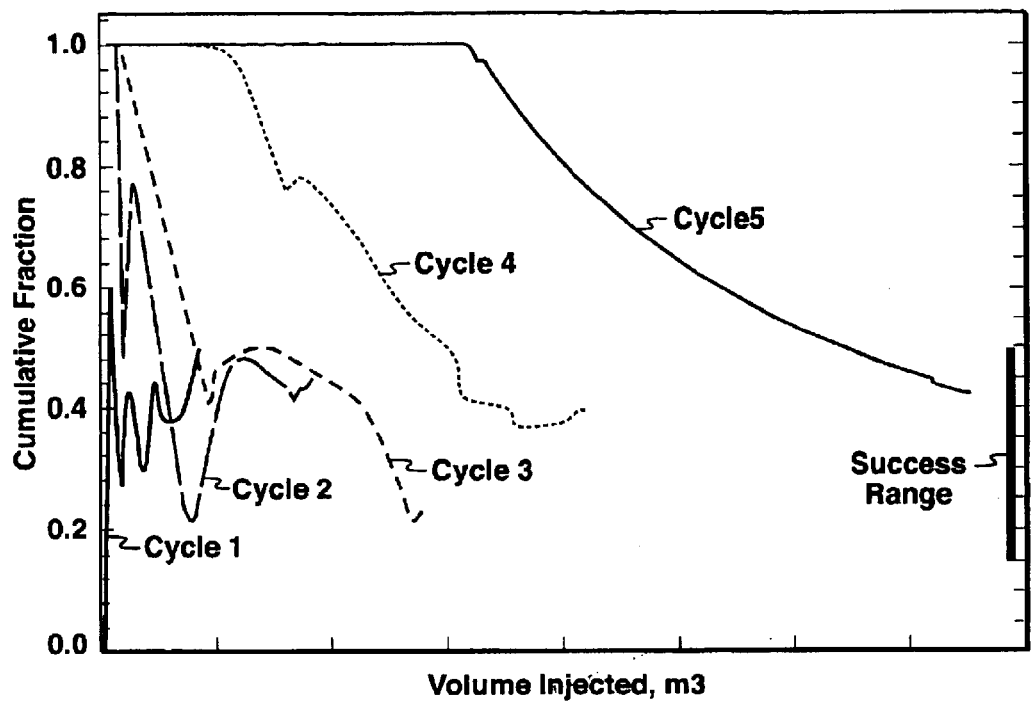
FIG. 3 shows fraction of solvent volume injected at or below fracture pressure during the vertical well field test at Cold Lake.

The ideal scenario is to achieve reservoir penetration, which results in good solvent mixing without dispersing the solvent too far as to be ineffective at reducing viscosity. To achieve such a balance, reservoir pressure is raised with the solvent injection to levels approaching the minimum in-situ stress. The fraction of solvent injected at or above this pressure is limited to be half to three quarters of the solvent injected. Ideally, poro-elastic behaviour under such conditions provides a large pore dilation which permits solvent to be distributed as numerous pore-scaled fingers to maximize solvent mixing over a large reservoir volume (FIG. 2C). Once the solvent is mixed with bitumen under the pore dilation conditions, the injected solvent is continually thickened as a fraction of bitumen is extracted and dissolved into the solvent. This in-situ viscosifying of solvent reduces the interfacial tension contrast between the displacing and displaced fluids and helps to minimize adverse tendencies of solvent fingering to be limited to a few large fingers.

The above mixing behaviour was demonstrated in a field study whereby a model solvent was injected through a vertical well located at a Cold Lake oil sand reservoir. Bottom hole pressure was monitored during the injection where rate of injection varied from 20 to 150 m$^3$/d. The study was performed over 5 injection/production cycles. Figure shows the fraction of solvent volume injected at or below the fracture pressures which was predetermined in a formation stress test prior to the solvent injection. Significant volume of the solvent was injected at or below the measured fracture pressure and was within the targets set for the test. The ensuing mixing behaviour achieved by formation dilation during the injection contributed significantly to achieving the bitumen production and solvent usage that were expected.

Minimization of Solvent Gas Production and Produced Solvent to Oil Ratio (PSOR)

Good mixing of solvent with bitumen during injection ensures significant oil and solvent production during the production phase. Production is carried out from the same well at a controlled pressure decline rate such that any "gas coning" effect is minimized. This effect occurred when the pressure declined rapidly. The accompanying high solvent gas production was detrimental to oil production.

A laboratory study was conducted in a three dimensional physical model packed with Cold Lake oil sand. The tests were performed to assess the physics of cyclic stimulation, measure production rate and solvent usage under the conditions of interest relating to the Cold Lake oil sand deposits. During the tests, ethane was injected into a horizontal well placed along one of the lower corners of a 50×50×27 (h) cm model, which was packed with Cold Lake bitumen and sand. The model was placed inside a sealed pressure vessel. The annulus between the model and the pressure vessel was pressurized with nitrogen to exert a confining pressure on the model and to prevent the sand pack from bulging during injection.

Figure 4:
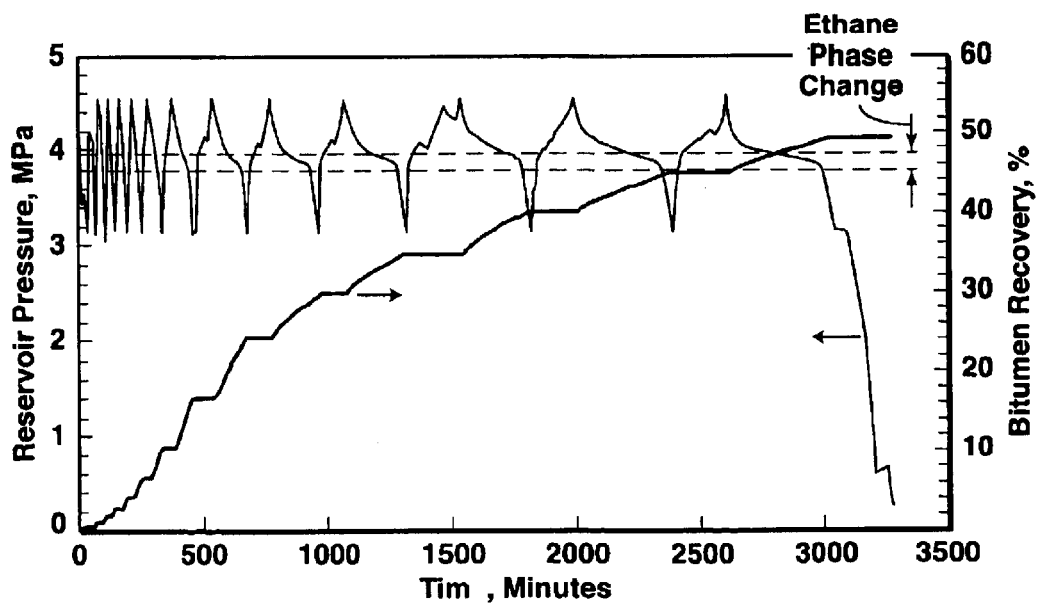
FIG. 4 shows oil recovery and pressure variation during CSP laboratory physical modelling experiments.

The laboratory tests demonstrated that by increasing reservoir pressure above the saturation pressure of ethane during injection, followed by decreasing pressure below the saturation pressure during production, incremental bitumen was produced. By repeating the cycles 13 times, 50% of the bitumen in the model was recovered in one of the experiments. FIG. 4 shows variation in the reservoir pressure from 4.5 MPa at the end of injection to 2.5 MPa at the end of production, and the accompanying oil recovery obtained from the experiment. Higher injection pressure in the field application would help formation dilation and promote pore-scale fluid mixing. Note that most of the oil was produced during the solvent phase transition, demonstrating the important role that solution gas drive played in the process.

Figure 5:
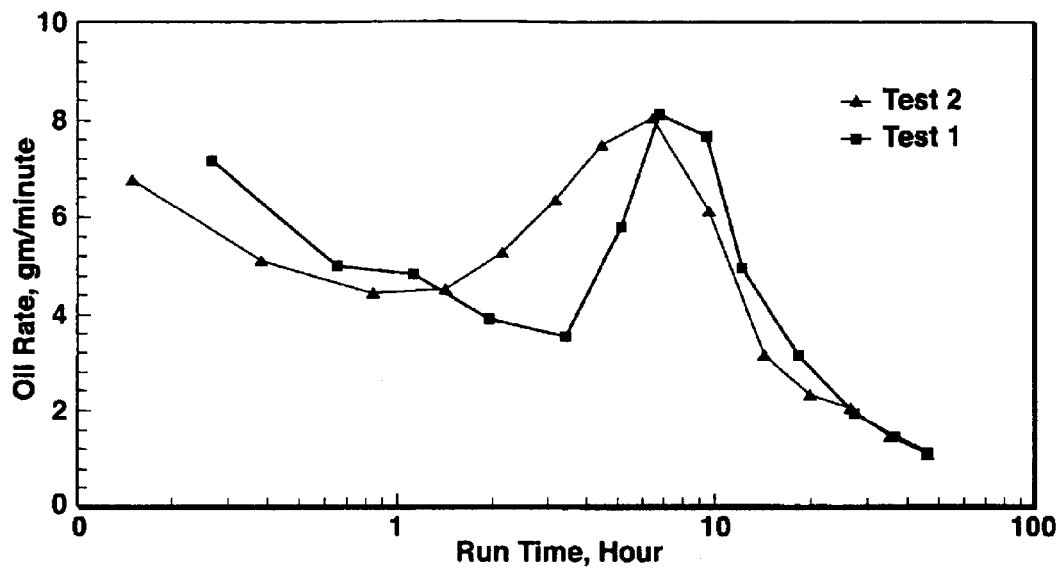
FIG. 5 shows production profile of CSP from laboratory tests.

A characteristic production profile of CSP is shown in FIG. 5. The initial rate is typically high and declines in early cycles; after reaching a minimum, it then rises rapidly to a peak value before declining again in the late cycles.

Figure 6:
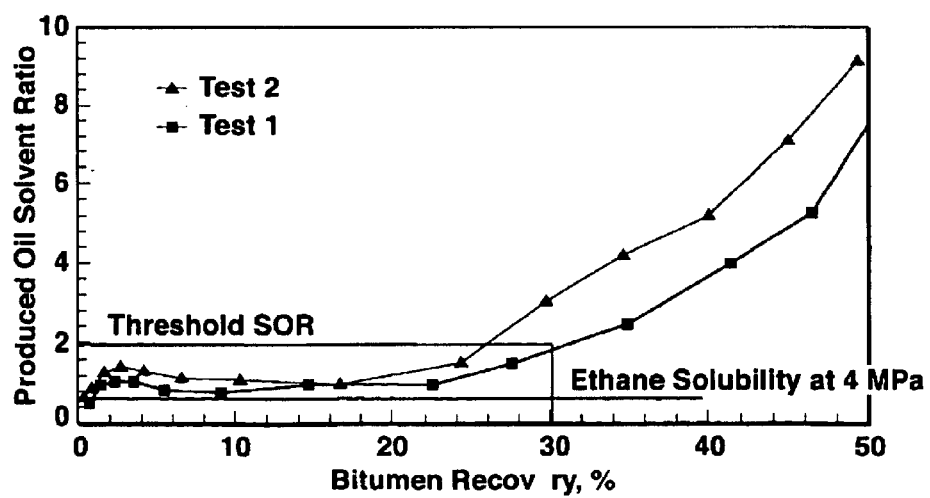
FIG. 6 shows solvent oil ratio profile of CSP from laboratory tests.

The accompanying produced solvent-oil ratio (PSOR) profile shown in FIG. 6 indicates that PSOR is low and close to the solubility limit in early cycles, implying that the solvent is fully utilized in mobilizing the bitumen. Solvent utilization in the subsequent cycles is relatively effective, indicated by the value of PSOR being less than twice the equilibrium PSOR for ethane in Cold Lake bitumen at 4 MPa. As bitumen recovery approaches 30%, PSOR begins to increase rapidly and reaches the value of 2–3. High PSOR in late cycles implies low effectiveness of the injected solvent for oil mobilization. For commercial application, this means the process has reached an economic threshold beyond which the incremental production will be offset by a higher compression cost for recycling the produced solvent.

Figure 7:
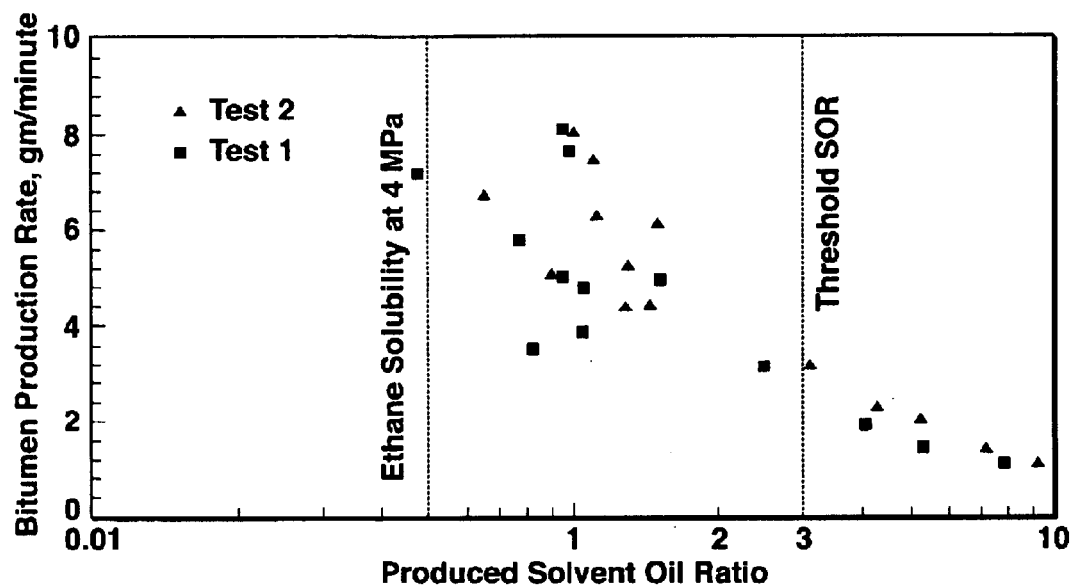
FIG. 7 shows the produced solvent to oil (PSOR) operating range for CSP from laboratory tests.

To further elucidate the importance of PSOR, a plot of production rate versus PSOR from the same experiments is shown in FIG. 7. Note that high production rate occurs when PSOR is between 0.5, which is the solubility limit of liquid ethane in bitumen at 4 MPa, and 1.5. As PSOR increases beyond the threshold value of 3, production rate drops significantly. The results of the laboratory study indicate the necessity for monitoring PSOR as part of a production strategy in the field. The measured PSOR should be used for proportioning the casing vent gas producing rate relative to the liquid pumping rate. High vent gas production can often lead to "gas coning" effect, and high PSOR and is detrimental to crude oil production.

Figure 8:
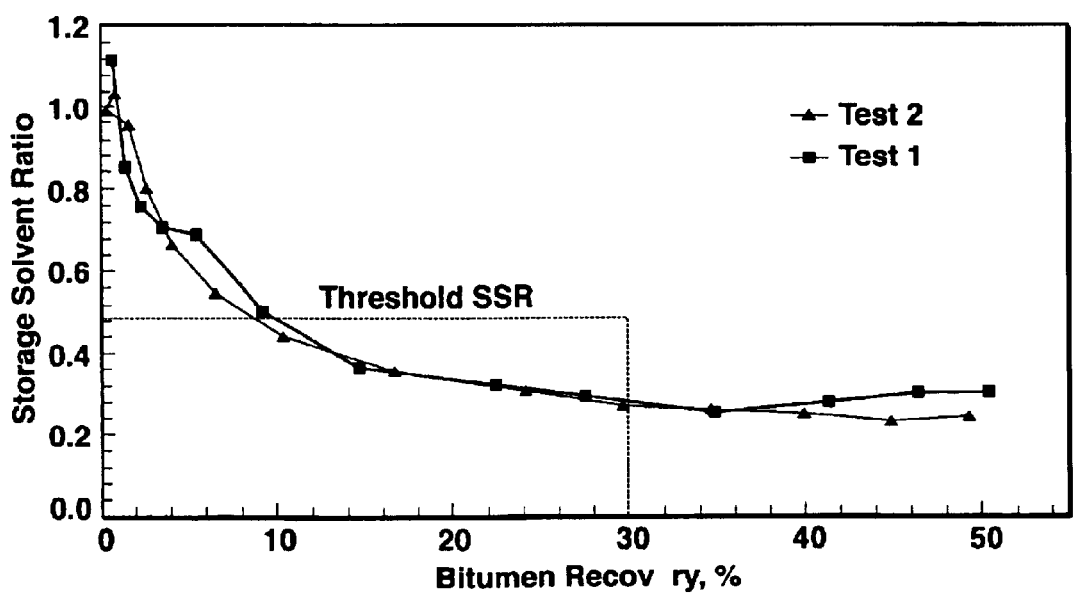
FIG. 8 shows storage solvent ratio profile of CSP from laboratory tests.

Maximization of Solvent Usage Efficiency and Minimization of Solvent Storage Ratio The solvent for the process is designed by matching its phase behaviour properties with reservoir conditions. Phase change of solvent from a liquid state during injection to a vapour state during production is beneficial to the process in two respects. First, it provides important drive energy through solution gas drive. Second, if gaseous solvent replaces the voidage in the reservoir as fluids are depleted, this minimizes the amount of solvent remaining in the reservoir, thus increasing the efficiency of solvent usage for the process. A particular solvent is said to be efficient when the storage solvent ratio (SSR) is low. The ratio is the volume of solvent expressed in liquid form remaining in the reservoir to the cumulative oil volume produced from the reservoir. Part of the solvent replaces the oil produced and occupies the voidage as a vapour, and the rest is mixed in bitumen not yet produced. FIG. 8 shows that the ratios obtained from two separate laboratory tests drop steadily to below 0.4. The ratio is reduced further to below 0.1 by blowdown at the end of the process. It has been shown that a process that injects pure ethane and recycles all the produced solvent is economical if the storage solvent ratio is kept below 0.4 as the process reaches the threshold oil recovery of 30%. For the above reasons, light hydrocarbons that are effective viscosity reducing agents such as ethane or propane are preferred for the process. They are relatively inexpensive compared with the heavier hydrocarbon solvents.

One method of lowering storage solvent ratio is to add methane to the injected solvent mixture. This is particularly effective in later cycles when formation voidage is large after substantial amount of bitumen has been produced. In this case, the voidage would be occupied by gaseous methane during injection thus reducing the amount of more expensive solvents such as ethane or diluent required for the process.

Figure 9:
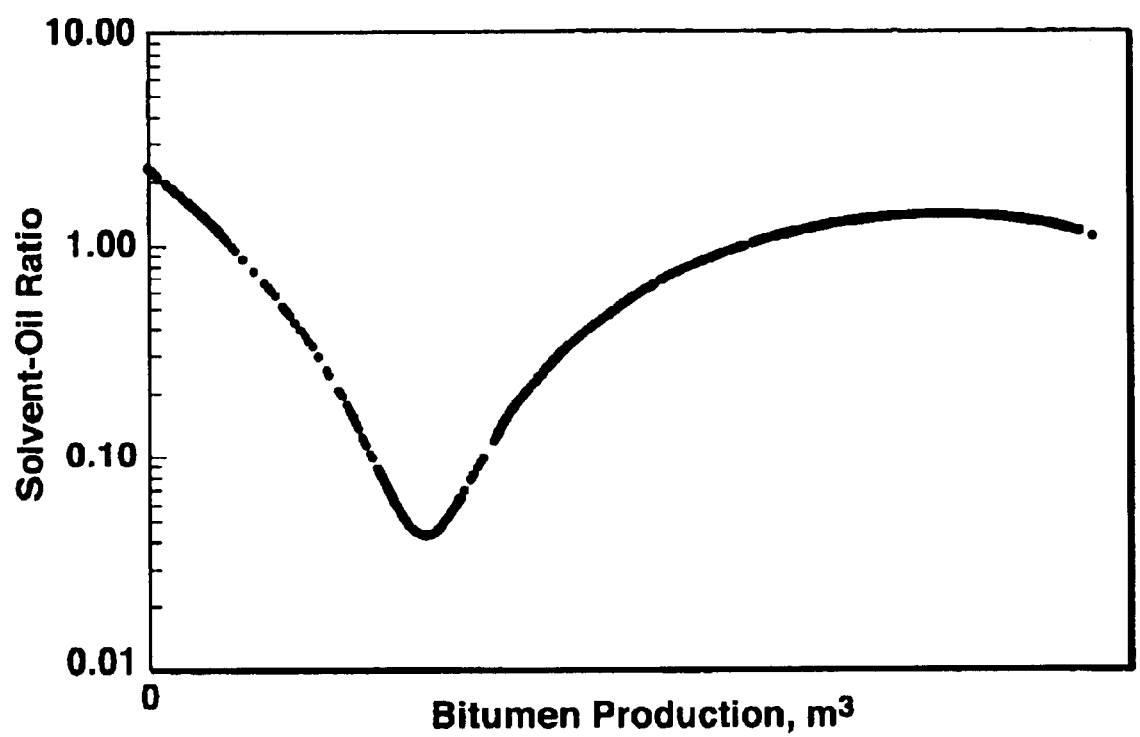
FIG. 9 shows instantaneous produced solvent oil ratio from the ethane injection horizontal well field test at Cold Lake.

Another CSP field test was conducted by injecting ethane to a short horizontal well in an oil sand reservoir at Cold Lake, Alberta. One of the objectives of the test was to study field scale mixing behaviour of ethane during injection. FIG. 9 shows the producing solvent-oil ratio during one of the production cycles in the study. Integrating the ratio over the cycle period produces a cycle PSOR value that is quite comparable to that observed from the laboratory tests shown in FIG. 5. With reference to FIG. 9, PSOR was high initially due to production of the injected ethane from the near wellbore region. As the ethane at the near wellbore area became depleted, the PSOR dropped. As the production continued, it rose and levelled off at a constant value of about one, indicating that ethane was well mixed with bitumen within the reservoir and both were produced back at a fairly constant ratio. The field test results show that the character of the ethane usage is consistent with good solvent utilization. If the ethane injected was sparsely distributed by thin long fingers, the total bitumen produced would be small and ethane recovery would be very poor (2A). If the ethane were distributed in a few thick fingers, high ethane recovery would result with the PSOR never reaching low values (2B). The benefit of many small fingers to achieve good mixing has been realized (2C).

Optimization of Solvent Mixing

In the event that solvent mobility is too high and formation dilation is not possible, solvent viscosity can be increased by dissolving a viscous liquid into it at the ground surface. A suitable liquid for this is the upper solvent-rich phase of an ethane/bitumen mixture. A schematic for recycling a small stream of produced bitumen into the ethane is shown in FIG. 1. Laboratory phase behaviour tests where ethane was mixed with Cold Lake bitumen show that the ethane-rich phase has a ten-fold increase in viscosity over pure ethane. The addition of a small volume of bitumen will provide the ideal blend viscosity for mobility control, which helps minimize adverse thick finger solvent fingering, enhance formation dilation and increase solvent/bitumen mixing and contact.

Figure 10:
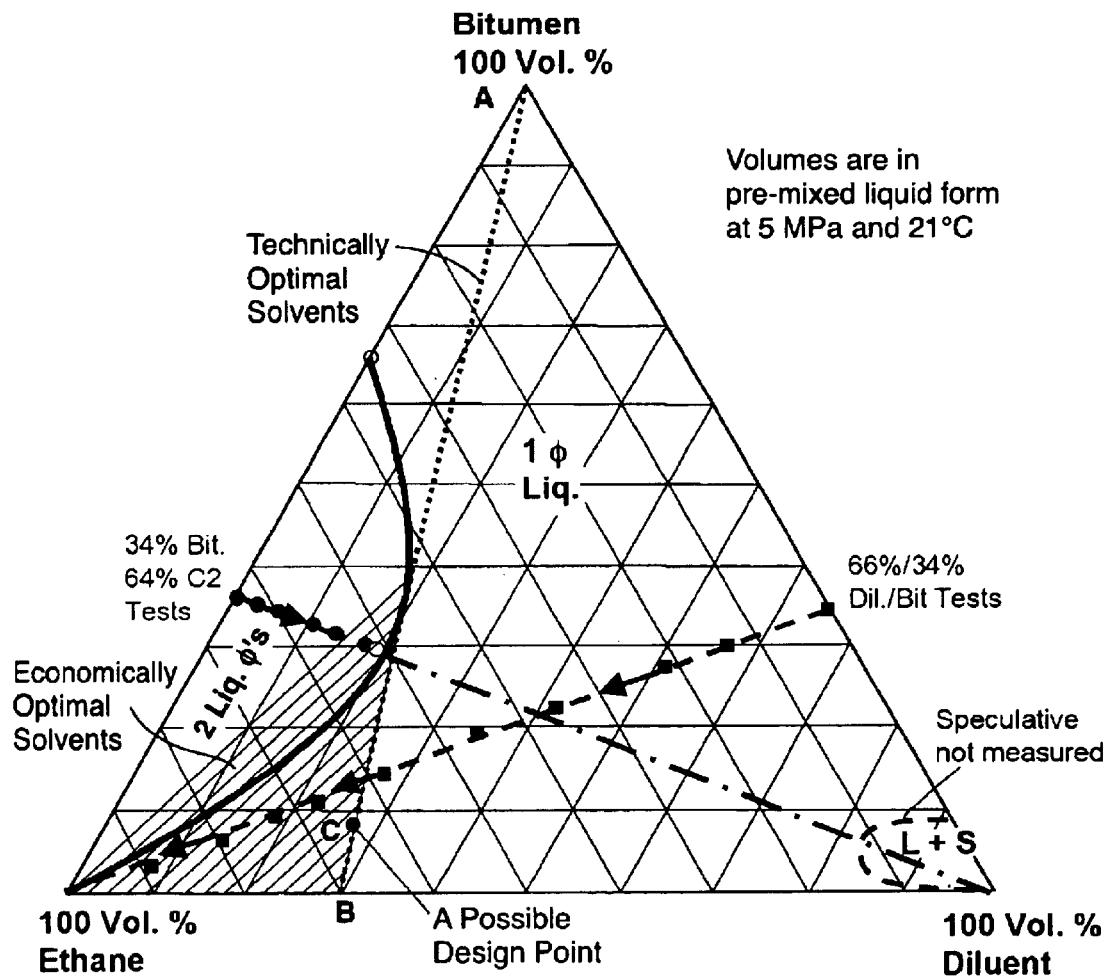
FIG. 10 shows phase diagram of diluent-ethane-Cold Lake bitumen system at 5 MPa and 21° C.

Addition of small quantity of diluent to an injected solvent will further improve the phase behaviour of the solvent system. The diluent used in the test has an IBP (initial boiling point) of 20° C., an average boiling point (as defined above) of 75° C. and a FBP (final boiling point) of 460° C. Results of hydrocarbon blending tests shown in FIG. 10 indicate that the diluent-ethane-bitumen system can be a very effective solvent mixture for CSP. The tests reveal an optimal CSP solvent design for single-phase recovery of bitumen as indicated by the mixing path line AB in FIG. 10 that is tangent to the two-phase boundary. This path provides the leanest diluent solvent composition C that will form a one-phase liquid at 5 MPa with any proportion of bitumen. While the solvents of composition along line AB behave like first contact miscible solvents, solvents in the shaded region to the left of line AB are multiple contact and near miscible solvents. These solvents, though not readily miscible with bitumen initially, would become miscible after multiple contact with bitumen in the reservoir. The dissolved diluent in bitumen will decrease the viscosity at low pressures compared to pure ethane and allow the reservoir pressure in a CSP production cycle to be drawn down much further than that possible with pure ethane. This solvent design assures single phase oil displacement in the high pressure region (>3.6 MPa) which permits better mixing and desirable flow behaviour (all solvent components staying together during mixing in porous media).

Figure 11:
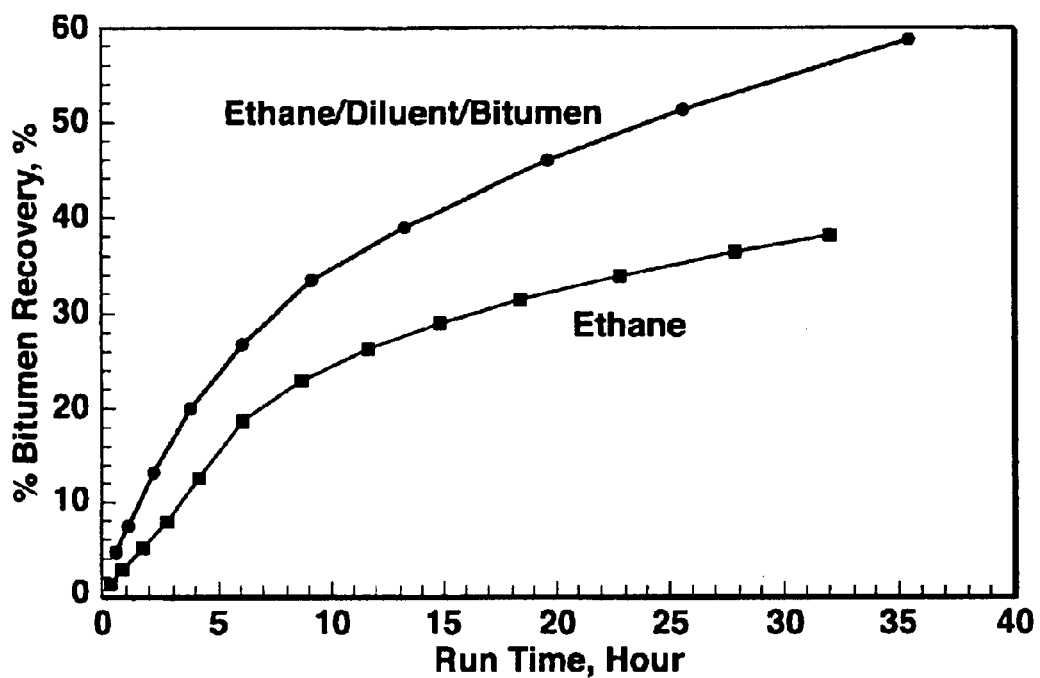
FIG. 11 compares bitumen recoveries from pure ethane injection test and diluent-ethane-bitumen mixture injection.

The benefits of injecting the above solvent mixture were demonstrated by comparing the results of two physical modelling experiments as shown in FIG. 11. These experiments were conducted in the same model at two separate occasions with pure ethane injected in the first experiment and an ethane/diluent/bitumen mixture in the second. The composition of the solvent mixture for the second test was that of point C in FIG. 10. Due to significantly higher net oil production, the second test achieved higher bitumen recovery for the same time duration and with fewer number of cycles, as shown in FIG. 11. Moreover, the storage solvent oil ratio and producing solvent oil ratio of the second test were lower than those of the first test.

Circulating a Diluent to Increase Drawdown and Improve Wellbore Inflow

Figure 12:
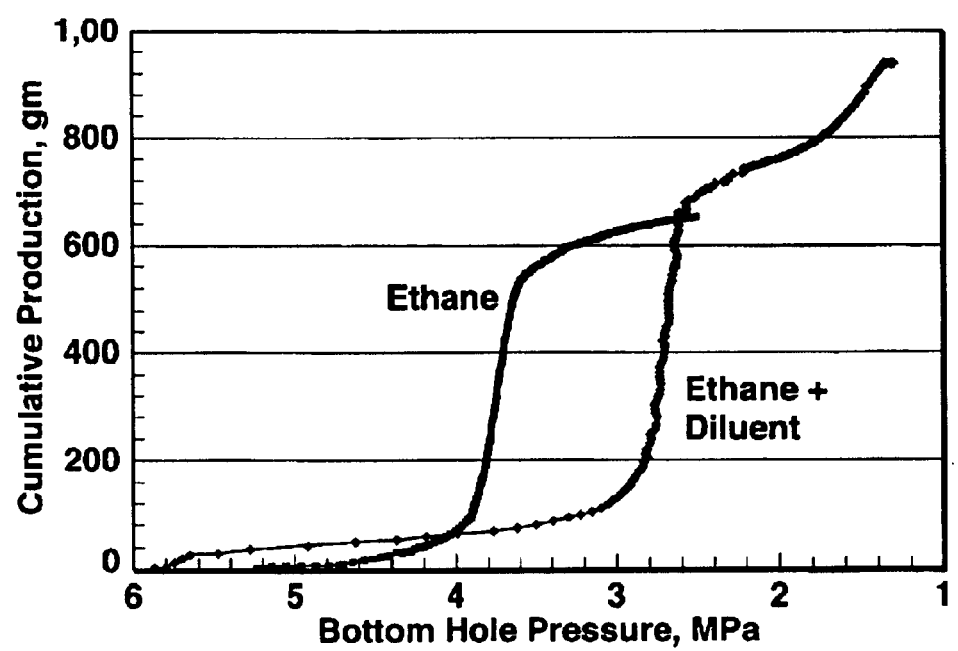
FIG. 12 shows greater pressure drawdown for fluid in-flow by diluent circulating or co-injection.

For a solvent-based process with pure ethane injection, production pressure drawdown may be limited by the ethane's saturation pressure. In this case, little oil will be produced when production pressure drops below 2.5 MPa due to excessive free gas production and high bitumen viscosity due to reduced solubility of the ethane at low pressure, as shown in FIG. 12. Note that most of the oil was produced during ethane phase transitional period which occurs at about 3.8 MPa at room temperature. As pressure drops below the phase transition, gas evolves in the reservoir and forms a connecting path to the wellbore. This reduces the effectiveness of gas in mobilizing oil during low-pressure production.

To overcome instances where the viscosity of produced fluids will limit the inflow into the wellbore, another element of the present invention is to circulate a hydrocarbon diluent down the well casing to the horizontal portion where it is diverted into the adjacent reservoir with the assistance of a diverting packer. The diluent mixes with the reservoir fluid near the well and reduces formation fluid's viscosity enabling it to enter the tail section of the horizontal liner easily. Because the near well pressure will decrease, the flow of reservoir fluids will increase. As observed from the experiments, the added diluent lowered the phase transitional pressure to 2.8 MPa and allowed for a greater pressure drawdown that significantly improved production. The lowering of the phase transitional pressure is the result of the change in solvent composition from adding diluent. Another benefit of this technique is that the diluent will absorb free methane and reduce its tendency to interfere with the pump efficiency.

The diluent added to the wellhead would be the portion of the diluent usually required for diluting bitumen for pipelining purpose and would therefore incur little extra cost except for the cost of non-recovered diluent. The diluent is bled into the wellbore and hence does not migrate very far into the formation so that it is therefore expected that this diluent loss would be small.

The diluent used in the diverting packer would be from the same source as the diluent used in the injection solvent mixture.

Improving Lifting Efficiency of Produced Oil

Another preferred element of the present invention is an artificial lift method in which the pump/lift intake is located at the toe of the horizontal well. This is different from conventional methods where the intake is typically located at the heel of the horizontal well. Either gas lift or a screw pump that can handle fluids of high gas content is quite appropriate for the application. Due to the high deviation of the wellbore, a downhole driver with a screw pump is preferred. Any free gas that exits in the horizontal well has a tendency to move upstream into the casing annulus while the liquid moves toward the pump intake. Lifting efficiency is significantly improved as a result of the down-hole gas separation since gas is known to impede pump efficiency. Another benefit of this pump configuration is for cases when the horizontal liner is plugged with viscous bitumen, cleaning of the liner can be done with a greater degree of success by circulating diluent to the casing annulus while pumping it out through the tubing or by reversing this circulation direction periodically to access both sides of any restriction.

Reducing Hydrate Formation

In the presence of connate water in reservoirs, light hydrocarbons are prone to form hydrates under very low temperature (<10° C.) and/or high pressure (>5 MPa) conditions. Hydrate is formed when water molecules form a crystalline structure that is stabilized in the presence of hydrocarbon gas. The conditions of the oil sand reservoirs are such that hydrates are less likely to form in the reservoir during injection or production phases. The hydrates, however, have a tendency to form in tubings or flowlines when gas expansion reduces fluids to sufficiently low temperatures. This happened in a number of occasions during the ethane injection field study. These hydrates blocked the tubing and affected production. Injection of a small quantity of hydrate inhibitor such as methanol to the casing annulus at the surface during the production phase was carried out and found to be quite effective in preventing such occurrences. Other chemicals such as ethanol, glycerin or salts, though not tested in this field experiment, are reportedly effective hydrate inhibitors.

Preferred Operating Ranges and Best Mode

The preferred operating ranges used in the practice of the invention known to date are:

| Parameter | Preferred Range | Most Preferred Range |
| --- | --- | --- |
| Temperature (° C.) of injected materials | 10–50 | 13–30 |
| Maximum injection pressure (Mpa) of injected materials | Minimum formation stress × (100% ± 20%) | Minimum formation stress × (100% ± 1%) |
| Minimum Production pressure (Mpa) | 0.5–3.0 | 1.5–2.5 |
| Injected materials | Ethane + Diluent + Bitumen + Methane | Ethane + Diluent + Bitumen + Methane |
| Diluent average boiling point ° C. | 21–400 | 36–174 |
| Bitumen viscosity, cp. | 1,000–1,000,000 | 10,000–200,000 |

In Cold Lake, the minimum formation stress is about 9 Mpa.

EXAMPLE

Commercial Scale Application of Cyclic Solvent Process

An example of how the process can be applied to produce Cold Lake bitumen on a commercial scale is described below. Field scale prediction from the simulation indicates that a commercial well of 750 m long can produce approximately 50 m3/d of bitumen on the average from a Cold Lake thin reservoir. Sixty such wells (see FIG. 1) on production operations would be required for a continuous bitumen production of 3,000 m3/d at a central plant. Each well would operate 9 years and recover about 25–30% of the bitumen in place. New wells would have to be drilled and started up to replace those that are approaching the end of the well life.

To reduce cost and environmental impact, ten wells are drilled from the same surface pad location. The horizontal sections of the 5 wells are oriented in parallel in the same direction in the reservoir while the other five wells are oriented in the opposite direction. Spacing of the wells in parallel in the reservoir is approximately 160 m apart. The wellheads of the 10 wells at the same pad are tied to manifolds which are connected to injection and production trunk lines to and from the central plant. Metering and well testing facilities are built in a satellite building at the pad for monitoring pressures, injection and production volumes. Several pads of similar facility design and well configuration are built in the field vicinity as necessary to meet production requirement.

Produced fluids from each production well flow through the manifold and are pumped to the central plant for processing. Each production well is tested at the pad site on a daily basis for bottom hole pressure, production volume and PSOR. The data on PSOR is used for optimizing pressure decline and production operations. Production of a well would be terminated if its PSOR is high (>3.0) and bottom hole pressure low (<1.5 MPa).

The produced fluids contain ethane, bitumen, diluent and small amount of connate water. Ethane is separated in the central plant through a series of high and low pressure separators and reused for injection. A small amount of diluent, supplied to the plant through a pipeline, is added to the produced fluids free of ethane to aid in the separation of water and oil. The "water-free" oil is finally trimmed with additional diluent to meet pipeline specification and shipped for marketing. In oil sand industry, the term "dilbit" is used to designate oil that contains diluent and bitumen.

Ethane is viscosified for injection at the central plant. Prior to the blending, ethane from a supply line and the recycle stream is compressed to a liquid state at 3.9 MPa and 20° C. At the upstream of an in-line mixer, the liquid ethane is mixed with a small stream of dilbit from the production stream. Sufficient dilbit is added to the mixture until viscosity of the blend reaches about 0.4 cp. A small stream of hydrate inhibitor such as methanol is also added. The injectant is then delivered to the various injection wells at the field through the injection trunk line. The injection is carried out at a constant discharge pressure of an injection pump located in the central plant. The pump discharge pressure is set a slightly above the formation minimum in-situ stress, i.e. 9 MPa, taking into account friction loss along the injection line. The injection to a well would gradually slow down and eventaully stop as the bottom-hole pressure rises and approaches the formation minimum in-situ stress of 9 MPa. Comparing to production cycle, injection is typically quite short and lasts several days to a week given sufficiency pump and solvent capacities.

What is claimed is:

1. A process for recovery of hydrocarbons in a production fluid from an underground reservoir of said hydrocarbons, the process comprising of:

(a) injecting a viscosity reducing solvent of a fraction of said hydrocarbons into said reservoir at a pressure in the reservoir of above a liquid/vapor phase change pressure of a fraction of said solvent; said pressure in said reservoir also being sufficient to cause geomechanical formation dilation or pore fluid compression, and then, (b) allowing said solvent to mix with said hydrocarbons under pore dilation conditions wherein the viscosity of said solvent is modified by dissolving a viscous hydrocarbon liquid comprising a mixture $C_4$ to $C_{20}$ diluent and bitumen into it, and then, (c) reducing the pressure in said reservoir to below said liquid/vapor phase change pressure of at least said fraction of said solvent thereby demonstrating solvent gas drive of said fraction of said hydrocarbons from said reservoir; and then, (d) repeating steps (a) to (c) as required.

2. A process for recovery of hydrocarbons in a production fluid from an underground reservoir of said hydrocarbons, the process comprising of:
   (a) injecting a viscosity reducing solvent of a fraction of said hydrocarbons into said reservoir at a pressure in the reservoir of above a liquid/vapor ohase change pressure of a fraction of the solvent, said solvent comprises methane or ethane and is admixed with $C_4$ to $C_{20}$ hydrocarbon diluent and bitumen in such a proportion that a single liquid hydrocarbon phase as well as multiple contact miscible hydrocarbons exist in the reservoir, said pressure in said reservoir also being sufficient to cause geomechanical formation dilation or pore fluid compression, and then,
   (b) allowing said solvent to mix with said hydrocarbons under pore dilation conditions, and then. (c) reducing the pressure in said reservoir to below said liquid/vapor phase change pressure of at least said fraction of said solvent thereby demonstrating solvent gas drive of said fraction of said hydrocarbons from said reservoir; and then.
   (d) repeating steos (a) to (c) as required.

3. A process for recovery of hydrocarbons in a production fluid from an underground reservoir of said hydrocarbons, the process comprising of:
   (a) injecting a viscosity reducing solvent of a fraction of said hydrocarbons into said reservoir and co-injecting a slug of a hydrate inhibitor into the reservoir at a pressure in the reservoir of above a liquid/vapor phase change pressure of a fraction of said solvents, said pressure in said reservoir also being sufficient to cause geomechanical formation dilation or pore fluid compression, wherein the pressure inside the reservoir is raised to levels approaching the minimum geomechanical in-situ stress level and then,
   (b) allowing said solvent to mix with said hydrocarbons under pore dilation conditions, and then,
   (c) reducing the pressure in said reservoir to below said liquid vapor phase change pressure of at least said fraction of said solvent thereby demonstrating solvent gas drive of said fraction of said hydrocarbons from said reservoir; and then,
   (d) repeating steps (a) to (c) as required.

4. A process for recovery of hydrocarbons in a production fluid from an underground reservoir of said hydrocarbons, the process comprising of:
   (a) injecting a viscosity reducing solvent of a fraction of said hydrocarbons into said reservoir at a pressure in the reservoir of above a liquid/vapor chase change pressure of a fraction of said solvent, said pressure in said reservoir also being sufficient to cause geomechanical formation dilation or pore fluid compression, wherein the pressure inside the reservoir is raised to levels approaching the minimum geomechanical in-situ stress level and then,
   (b) allowing said solvent to mix with said hydrocarbons under pore dilation conditions, and then,
   (c) reducing the pressure in said reservoir to below said liquid/vapor phase change pressure of at least said fraction of said solvent thereby demonstrating solvent gas drive of said fraction of said hydrocarbons from said reservoir, hydrate inhibitor is injected through a casing annulus; and the
   (d) repeating steps (a) to (c) as required.

5. A process for recovery of hydrocarbons in a production fluid from an underground reservoir of said hydrocarbons, the process comprising of:
   (a) injecting a viscosity reducing solvent of a fraction of said hydrocarbons into said reservoir at a pressure in the reservoir of above a liquid/vapor phase change pressure of a fraction of said solvent, said pressure in said reservoir also being sufficient to cause geomechanical formation dilation or pore fluid compression, and then,
   (b) allowing said solvent to mix with said hydrocarbons under pore dilation conditions, and then,
   (c) reducing the pressure in said reservoir to below said liquid/vapor phase change pressure of at least said fraction of said solvent thereby demonstrating solvent gas drive of said fraction of said hydrocarbons from said reservoir, circulating a $C_4$ to $C_{20}$ hydrocarbon diluent down a well casing to a horizontal well portion, mixing the diluent with reservoir fluid near the vertical portion of the well thereby reducing fluid viscosity, and enabling it to enter a heel portion of the horizontal well liner thereby resulting into a decrease in well pressure near the vertical portion and increase in flow of reservoir fluids, and then,
   (d) repeating steps (a) to (c) as required.

6. A method of recovering hydrocarbons in a production fluid from an underground reservoir comprising:
   (a) determining the minimum in-situ stress of the target reservoir by injecting fluid from a suitable fluid,
   (b) viscosifying a pure hydrocarbon solvent with produced bitumen in a proportion designed to favorably achieve a substantially single liquid phase when mixed with reservoir bitumen under reservoir conditions,
   (c) injecting the hydrocarbon blend at pressures intermittently slightly above and below the minimum in-situ stress wherein the pressure-time profile resembles a saw-tooth waveform, the cumulative volume injected at or below the minimum in-situ stress is monitored to achieve a favorable target range of the total injected volume,
   (d) producing the pressurized solvent and reservoir hydrocarbons in stages in decreasing pressure settings wherein the reservoir hydrocarbons can be brought to surface; and
   (e) Repeating steps (b) to (d) as required.

7. The method of claim 6 wherein the bitumen contains diluent.

8. The method to claim 6 wherein the viscosity of the solvent in step (b) is continuously adjusted by mixing in a stream of viscous hydrocarbon liguids into the solvent line.

9. The method of claim 8 wherein said viscous hydrocarbon liguid comprises a mixture comprising $C_4$ to $C_{20}$ diluent and bitumen.

10. The method of claim 6 wherein the viscosity of the solvent under the reservoir conditions in step (b) is greater than 0.1 cp.

11. The method of claim 6 wherein the mixing proportion of said solvent with said bitumen blend is adjusted to constantly achieve a single liquid phase when it mixes with the reservoir bitumen under reservoir conditions.

12. The method of claim 6 wherein the upper or lighter portion of the blend is separated out and used as the injectant.

13. The method of claim 6 wherein the cumulative volume injected at or below the minimum in-situ stress is in the range of at least 15% and no more than 50% of the total injected volume.

14. The method of claim wherein the viscosity of the solvent is modified by dissolving a viscous hydrocarbon liquid into it during solvent injection.

15. The method of claim 6 wherein at least a portion of the solvent for the method is selected from the arouo consisting of methane, ethane and propane and any combination thereof, and is mixed with a $C_4$ to $C_{20}$ hydrocarbon diluent and bitumen in such a proportion that a single liquid hydrocarbon chase as well as multiple contact miscible and near-miscible hydrocarbons exist in the reservoir.

16. The method of claim 6 wherein a slug of a hydrate inhibitor is co-injected into the reservoir.

17. The method of claim 16 wherein the hydrocarbon diluent is employed when the production fluid would otherwise be too viscous to pump.

18. The method of claim 6 wherein a hydrate inhibitor is injected throuah a casing annulus during step (c).

19. The method of claim 6 further comprising circulating $C_1$ to $C_{20}$ hydrocarbon diluent down a well casing to a horizontal well portion during step (c), mixing the diluent with reservoir fluid near the vertical portion of the well thereby reducing fluid viscosity, and enabling it to enter a heel portion of the horizontal well liner thereby resulting into a decrease in well pressure near the vertical portion and increase in flow of reservoir fluids.

* * * * *